(12) United States Patent

Boco et al.

(10) Patent No.: US 12,678,895 B2

(45) Date of Patent: Jul. 14, 2026

(54) METHOD FOR COMPARING LASER PROCESSING SYSTEMS AND METHOD FOR MONITORING A LASER PROCESSING PROCESS AND ASSOCIATED LASER PROCESSING SYSTEM

(71) Applicant: Precitec GmbH & Co. KG, Gaggenau (DE)

(72) Inventors: Attila Boco, Gaggenau (DE); Florian Staudenmaier, Karlsruhe (DE); Georg Spoerl, Rhenstetten (DE); Matthias Strebel, Gaggenau (DE)

(73) Assignee: Precitec Gmbh & Co. KG, Gaggenau (DE)

( * ) Notice: Subject to any disclaimer, the term of this patent is extended or adjusted under 35 U.S.C. 154(b) by 1050 days.

(21) Appl. No.: 17/723,824

(22) Filed: Apr. 19, 2022

(65) Prior Publication Data

US 2022/0331911 A1     Oct. 20, 2022

(30) Foreign Application Priority Data

Apr. 19, 2021   (DE) .......................... 102021109787.8

(51) Int. Cl.
*B23K 26/70*          (2014.01)
*B23K 26/042*         (2014.01)

(52) U.S. Cl.
CPC .......... *B23K 26/705* (2015.10); *B23K 26/043* (2013.01)

(58) Field of Classification Search
CPC ............................. B23K 26/043; B23K 26/705
(Continued)

(56) References Cited

U.S. PATENT DOCUMENTS

| | | | | |
|---|---|---|---|---|
| 4,564,012 A | * | 1/1986 | Shimada | ............ B23K 26/0096 |
| | | | | 219/121.62 |
| 4,827,099 A | * | 5/1989 | Krebs | .................... C21D 9/505 |
| | | | | 219/121.64 |

(Continued)

FOREIGN PATENT DOCUMENTS

| | | |
|---|---|---|
| DE | 4333501 A1 | 4/1995 |
| DE | 10130875 A1 | 1/2003 |

(Continued)

OTHER PUBLICATIONS

CN First Office Action dated Sep. 30, 2024 pertaining to CN application No. 202210408195.8 filed Apr. 19, 2022, pp. 1-10.

*Primary Examiner* — Jimmy Chou

(74) *Attorney, Agent, or Firm* — DINSMORE & SHOHL LLP

(57)          ABSTRACT

A method for comparing laser machining systems is provided, wherein a laser machining system comprises a laser machining head and a sensor module having at least one photodiode for detecting process radiation, said method comprising: detecting radiation emitted from a light source by means of the photodiode and generating a corresponding intensity signal, wherein the radiation is guided from the light source to the photodiode by at least one optical element in the laser machining head and/or by at least one optical element of the sensor module; aligning the laser machining head and the light source with one another so that the intensity signal assumes a maximum value; and comparing the intensity signal with at least one predetermined reference value. A method for monitoring a laser machining process and an associated laser machining system are also provided.

13 Claims, 5 Drawing Sheets

(58) Field of Classification Search
USPC ..................................................... 219/121.79
See application file for complete search history.

(56)                    References Cited

U.S. PATENT DOCUMENTS

| 5,486,677 | A | * | 1/1996 | Maischner | ........... | B23K 26/032 |
| | | | | | | 219/121.83 |
| 5,869,805 | A | * | 2/1999 | Beyer | ................. | B23K 26/032 |
| | | | | | | 219/121.64 |
| 5,961,859 | A | * | 10/1999 | Chou | ................... | B23K 26/032 |
| | | | | | | 219/121.64 |
| 6,023,044 | A | * | 2/2000 | Kosaka | ................... | B23K 9/025 |
| | | | | | | 901/42 |
| 6,060,685 | A | * | 5/2000 | Chou | ................... | B23K 26/032 |
| | | | | | | 219/121.64 |
| 6,215,094 | B1 | * | 4/2001 | Dausinger | .............. | B23K 26/40 |
| | | | | | | 219/121.62 |
| 6,268,585 | B1 | * | 7/2001 | Ichikawa | ............. | B23K 26/361 |
| | | | | | | 219/121.73 |
| 6,670,574 | B1 | * | 12/2003 | Bates | ................... | B23K 26/032 |
| | | | | | | 219/121.64 |
| 6,791,057 | B1 | * | 9/2004 | Kratzsch | ................ | B23K 26/24 |
| | | | | | | 219/121.62 |
| 7,804,043 | B2 | * | 9/2010 | Deshi | ................. | B23K 26/0624 |
| | | | | | | 219/121.72 |
| 7,989,730 | B2 | * | 8/2011 | Regaard | ................. | B23K 26/04 |
| | | | | | | 219/121.63 |
| 8,198,566 | B2 | * | 6/2012 | Baird | .................... | B23K 26/40 |
| | | | | | | 219/121.68 |
| 8,624,153 | B2 | * | 1/2014 | Atsumi | .................. | B23K 26/53 |
| | | | | | | 219/121.72 |
| 9,427,823 | B2 | * | 8/2016 | Alfille | ................ | B23K 26/1437 |
| 9,517,533 | B2 | * | 12/2016 | Uchida | .................. | G01B 11/30 |
| 10,578,428 | B2 | * | 3/2020 | Strebel | .............. | G01B 9/02091 |
| 11,396,062 | B2 | * | 7/2022 | Moser | .................. | B01D 1/0017 |
| 11,511,370 | B2 | * | 11/2022 | Sakurai | .................. | G01B 11/02 |
| 2002/0079296 | A1 | * | 6/2002 | Dijken | ................... | H05K 3/328 |
| | | | | | | 219/121.64 |
| 2002/0158053 | A1 | * | 10/2002 | Kessler | ................ | B23K 26/034 |
| | | | | | | 219/121.83 |
| 2006/0011592 | A1 | * | 1/2006 | Wang | ................... | B23K 26/034 |
| | | | | | | 219/121.64 |
| 2006/0019503 | A1 | * | 1/2006 | Takami | .............. | H01L 21/268 |
| | | | | | | 438/795 |
| 2006/0243708 | A1 | * | 11/2006 | Ikenoue | ............ | H01L 21/76898 |
| | | | | | | 219/121.62 |
| 2009/0272877 | A1 | * | 11/2009 | Tamaoki | .................... | G01J 1/20 |
| | | | | | | 250/201.1 |
| 2010/0133243 | A1 | * | 6/2010 | Nomaru | ............... | B23K 26/032 |
| | | | | | | 219/121.67 |
| 2010/0288739 | A1 | * | 11/2010 | Lee | ........................ | G01B 11/02 |
| | | | | | | 219/121.67 |
| 2011/0109911 | A1 | * | 5/2011 | Podoleanu | ............. | A61B 3/102 |
| | | | | | | 356/451 |
| 2011/0180521 | A1 | * | 7/2011 | Quitter | ................. | B23K 26/046 |
| | | | | | | 219/121.73 |
| 2012/0138586 | A1 | * | 6/2012 | Webster | .................. | B23K 15/08 |
| | | | | | | 219/121.64 |
| 2012/0211474 | A1 | * | 8/2012 | Hayashimoto | ..... | B23K 26/0665 |
| | | | | | | 219/121.64 |
| 2012/0285936 | A1 | * | 11/2012 | Urashima | .......... | G01B 9/02091 |
| | | | | | | 219/121.63 |
| 2012/0318775 | A1 | * | 12/2012 | Schwarz | .............. | B23K 26/032 |
| | | | | | | 356/606 |
| 2013/0043225 | A1 | * | 2/2013 | Schurmann | .......... | B23K 26/044 |
| | | | | | | 219/121.64 |
| 2013/0062324 | A1 | * | 3/2013 | Dorsch | .................. | B23K 26/20 |
| | | | | | | 219/121.63 |

| 2013/0068738 | A1 | * | 3/2013 | Schurmann | ............ | B23K 26/03 |
| | | | | | | 219/121.72 |
| 2013/0223724 | A1 | | 8/2013 | Wersborg et al. | | |
| 2013/0319980 | A1 | * | 12/2013 | Hesse | ................... | B23K 26/032 |
| | | | | | | 219/121.62 |
| 2014/0138363 | A1 | * | 5/2014 | Hammann | ............. | B23K 26/04 |
| | | | | | | 219/121.78 |
| 2014/0353296 | A1 | * | 12/2014 | Fukuhara | ............... | B23K 26/40 |
| | | | | | | 219/121.67 |
| 2015/0014889 | A1 | * | 1/2015 | Goya | ................. | B23K 26/0652 |
| | | | | | | 219/121.72 |
| 2015/0224600 | A1 | * | 8/2015 | Spiess | .................. | B23K 26/032 |
| | | | | | | 219/121.72 |
| 2015/0352666 | A1 | * | 12/2015 | Fujita | ................... | B23K 26/046 |
| | | | | | | 219/121.61 |
| 2016/0039045 | A1 | * | 2/2016 | Webster | ............. | B23K 26/0643 |
| | | | | | | 356/450 |
| 2016/0059350 | A1 | * | 3/2016 | Schoenleber | .......... | B23K 26/04 |
| | | | | | | 219/121.81 |
| 2016/0114434 | A1 | * | 4/2016 | Regaard | .............. | B23K 26/046 |
| | | | | | | 219/121.81 |
| 2016/0193692 | A1 | * | 7/2016 | Regaard | ............... | B23K 31/125 |
| | | | | | | 219/121.62 |
| 2016/0202045 | A1 | * | 7/2016 | Schönleber | .......... | B23K 26/046 |
| | | | | | | 356/497 |
| 2016/0339541 | A1 | * | 11/2016 | Spoerl | .................. | B23K 26/064 |
| 2016/0354867 | A1 | * | 12/2016 | Matsuoka | .............. | B23K 26/24 |
| 2016/0356595 | A1 | * | 12/2016 | Lessmueller | ........ | B23K 26/044 |
| 2017/0001261 | A1 | * | 1/2017 | Fujiwara | .............. | B23K 26/082 |
| 2017/0043431 | A1 | * | 2/2017 | Kuba | ................... | B23K 26/032 |
| 2017/0095885 | A1 | * | 4/2017 | Zhang | ................... | B23K 26/21 |
| 2017/0109874 | A1 | * | 4/2017 | Hallasch | ............... | B23K 26/60 |
| 2017/0120337 | A1 | * | 5/2017 | Kanko | .............. | B23K 15/0013 |
| 2017/0259373 | A1 | * | 9/2017 | Albert | ................. | B23K 31/125 |
| 2017/0326669 | A1 | * | 11/2017 | Moser | .............. | B23K 15/0013 |
| 2017/0334019 | A1 | * | 11/2017 | Izumi | .................. | B23K 26/032 |
| 2018/0126491 | A1 | * | 5/2018 | Nakagawa | ......... | B23K 26/0626 |
| 2018/0221989 | A1 | * | 8/2018 | Matsuoka | ............ | B23K 26/082 |
| 2018/0264600 | A1 | * | 9/2018 | Sugino | ................. | B23K 26/03 |
| 2018/0372483 | A1 | * | 12/2018 | Moser | ................... | G01B 11/22 |
| 2019/0015931 | A1 | * | 1/2019 | Kogel-Hollacher | ... | B23K 26/34 |
| 2019/0041196 | A1 | * | 2/2019 | Strebel | .................. | G01B 11/22 |
| 2019/0126389 | A1 | * | 5/2019 | Fukae | ............... | B23K 26/0604 |
| 2019/0240785 | A1 | * | 8/2019 | Magg | ................. | B23K 26/0626 |
| 2019/0299331 | A1 | * | 10/2019 | Moser | ................. | B23K 26/064 |
| 2019/0375051 | A1 | * | 12/2019 | Regaard | ................ | B23K 26/38 |
| 2020/0038993 | A1 | * | 2/2020 | Schwarz | ............... | G01B 11/14 |
| 2020/0198049 | A1 | * | 6/2020 | Yokoyama | ........... | B23K 31/003 |
| 2020/0262004 | A1 | * | 8/2020 | Moser | ................. | B23K 26/702 |
| 2020/0361038 | A1 | * | 11/2020 | Takechi | ................. | G01B 11/22 |
| 2020/0376591 | A1 | * | 12/2020 | Sakai | ................... | B23K 26/064 |
| 2020/0376592 | A1 | * | 12/2020 | Sakai | ................... | B23K 26/032 |
| 2021/0023656 | A1 | * | 1/2021 | Sakai | ................. | B23K 26/244 |
| 2021/0031298 | A1 | * | 2/2021 | Sakai | ........................ | G01B 9/02 |
| 2021/0229220 | A1 | * | 7/2021 | Regaard | ................ | B23K 26/38 |
| 2023/0073549 | A1 | * | 3/2023 | Reiser | .................. | B23K 31/125 |
| 2023/0191530 | A1 | * | 6/2023 | Pinder | ............... | B23K 26/0643 |
| | | | | | | 219/121.83 |
| 2024/0207970 | A1 | * | 6/2024 | Sakai | ................... | B23K 31/125 |

FOREIGN PATENT DOCUMENTS

| DE | 102004016669 | B3 | 10/2005 |
| DE | 102017129729 | A1 | 6/2019 |
| DE | 102018210927 | A1 | 1/2020 |
| DE | 102019122047 | A1 | 2/2021 |
| DE | 102019127900 | B3 | 4/2021 |
| DE | 102020104462 | A1 | 8/2021 |
| WO | 2012013818 | A1 | 2/2012 |
| WO | 2020099421 | A1 | 5/2020 |

* cited by examiner

METHOD FOR COMPARING LASER PROCESSING SYSTEMS AND METHOD FOR MONITORING A LASER PROCESSING PROCESS AND ASSOCIATED LASER PROCESSING SYSTEM

CROSS-REFERENCE TO RELATED APPLICATIONS

This application claims priority to Germany application number 102021109787.8 filed Apr. 19, 2021, the disclosure of which is hereby incorporated by reference in its entirety.

FIELD OF THE INVENTION

The invention relates to a method for comparing laser machining systems or components of one or more laser machining systems, and a method for monitoring a laser machining process and a laser machining system configured to carry out these methods.

BACKGROUND OF THE INVENTION

In a laser machining system, also referred to as a laser machining equipment or equipment for short, the laser beam emerging from a laser beam source or one end of a laser optical fiber is focused onto a workpiece to be machined with the aid of beam guiding optics in order to locally heat the workpiece to melting temperature. The beam guiding optics includes, for example, focusing optics, a beam splitter, a deflection unit, etc. Machining may include laser welding or laser cutting. The laser machining system may include a laser machining head, for example a laser welding head or a laser cutting head. The laser machining process may include a laser welding process and a laser cutting process.

In order to ensure machining quality, it is important to monitor the laser machining process. Monitoring is typically performed by detecting and evaluating process radiation produced during the laser machining process, also called process light or process emissions. The process radiation includes the laser radiation scattered back or reflected back by the workpiece, process emissions in the infrared wavelength range of light, such as thermal radiation, and process emissions in the visible wavelength range of light, such as radiation from plasma created by machining.

The process radiation is typically detected by at least one sensor, for example a photodiode. The sensor detects an intensity of the process radiation at a specified wavelength or in a specified wavelength range and generates a corresponding intensity signal. For monitoring purposes, the intensity signal is compared, for example, with predefined envelopes and/or threshold values and an error is output when the intensity signal is outside the envelope or exceeds or falls below a threshold value.

Monitoring systems which can use the radiation (process radiation) reflected back from the process to provide qualitative information about the quality of a weld seam are usually used in laser welding. The ratio of the radiation fed back from the process to the monitoring system is largely dependent on the components involved and the quality thereof. Manufacturing tolerances and fluctuations in the quality of optical and/or mechanical components of the laser machining system and/or the monitoring system may result in major differences in the corresponding signal ranges. For example, structurally similar or identical deflection units, scanners, or optical elements of the laser machining head, such as lenses, mirrors, etc., may have different properties due to manufacturing tolerances. Manufacturing tolerances in photodiodes may also lead to differences in the detected process radiation. Corresponding intensity signals may therefore differ in laser machining systems of the same construction. For example, mean signal levels, also referred to as signal strengths, of the intensity signals may differ.

These differences between the intensity signals make it difficult or impossible to compare systems which are of similar type or of the same construction. In addition, the same monitoring parameters such as envelopes or threshold values cannot be used to monitor a given laser machining process on laser machining systems of the same type or of the same construction. The detection of errors in the laser machining process is also no longer ensured. In industrial series production in particular, usually a plurality of systems of the same construction are used, with comparability playing an increasingly important role in the evaluation of the intensity signals. Accordingly, a meaningful and stable comparison of the beam guidance properties of systems of the same construction is required in order to enable a high quality of process monitoring.

SUMMARY OF THE INVENTION

It is an object of the present disclosure to provide a method by which a plurality of laser machining systems of the same type or same construction, in particular components of laser machining systems, can be compared.

It is also an object of the present disclosure to provide a method by means of which properties, in particular beam guidance and/or detection properties, of a number of laser machining systems of the same construction, in particular of the sensor modules and/or laser machining heads contained therein, become comparable.

It is also an object of the invention to provide a method by means of which properties, in particular beam guidance and/or detection properties, of a given laser machining system can be compared at different points in time.

Furthermore, it is an object of the present disclosure to provide a method which allows for monitoring, with identical monitoring parameters, identical laser machining processes carried out by laser machining systems of the same type or of the same construction with identical process parameters.

It is also an object of the present disclosure to provide a laser machining system configured to carry out such methods.

One or more of these objects are achieved by the subject matter disclosed herein. Advantageous refinements and developments are the subject matter also disclosed herein.

The invention is based on the idea of using a sensor, in particular a photodiode-based sensor, of a sensor module of a laser machining system to detect the radiation intensity of a radiation emitted by a light source and to generate an intensity signal based thereon. Here, the radiation is guided between the radiation source and the photodiode by at least one optical element of the laser machining head and/or the sensor module. Guiding may include reflecting and/or transmitting the radiation by means of the optical element. The radiation intensity may be emitted by the light source and detected by the sensor, for example in an infrared wavelength range, in a visible wavelength range and/or at a wavelength of a machining laser beam of the laser machining system. This at least one wavelength range preferably corresponds to a wavelength range of the process radiation detected by the sensor module for error detection or process monitoring. The laser machining system, i.e. the laser machining head and/or the sensor module, and the light source are aligned with one another in such a way that the detected intensity signal assumes a maximum value. The detected intensity signal is then compared with at least one reference value.

This method allows for a comparison of a plurality of laser machining systems of similar type (i.e. identical or of the same construction) based on the detected intensity signals when these signals are compared to at least one reference value. By using radiation from a light source, in particular a stabilized light source, to generate the intensity signals, the laser machining system, i.e. the laser machining head and/or the sensor module, can be inspected quickly and easily, independently of the process, and the comparability of the intensity signals of a plurality of laser machining systems used of the same type for monitoring laser machining processes can be ensured.

Moreover, a scaling factor may be determined based on the detected intensity signal and the reference value. This in turn makes it possible to monitor identical laser machining processes carried out by the plurality of laser machining systems of the same type, with the same monitoring parameter(s). In this case, either the intensity signal detected by the respective laser machining system or the monitoring parameters can be scaled using the scaling factor for this laser machining system.

Within the scope of the present disclosure, laser machining systems that are identical, of the same construction or of the same type mean a plurality of instances of one type of laser machining system. These instances may be of the same commercially available type or model of laser machining system. The same or identical laser machining processes denote laser machining processes that are or were carried out with identical process parameters.

According to a first aspect of the present disclosure, a method for comparing laser machining systems or components of at least one laser machining system is provided, wherein a laser machining system comprises a laser machining head and a sensor module including at least one sensor for detecting process radiation, preferably a photodiode-based sensor or a photodiode.

The method comprises: detecting radiation emitted from a light source by means of the sensor and generating a corresponding intensity signal, the radiation being guided from the light source to the sensor by at least one optical element in the laser machining head and/or by at least one optical element in the sensor module; aligning the laser machining head and the light source with each other so that the intensity signal assumes a maximum value; and comparing the intensity signal to a predetermined reference value.

The sensor, or the photodiode-based sensor or the photodiode, is preferably configured to detect process radiation of a laser machining process, in particular a laser machining process in which a machining laser beam is radiated through the laser machining head onto at least one workpiece (to be machined). The sensor, or the photodiode-based sensor or the photodiode, is preferably configured to detect process radiation of the laser machining process in a predetermined wavelength range and/or at a predefined wavelength. In particular, the sensor, or the photodiode-based sensor or the photodiode, may be configured to detect an intensity of process radiation in a specified wavelength range and/or at a specified wavelength and to generate a corresponding intensity signal (and output the intensity signal). The process radiation is, in particular, process radiation generated when the laser machining process is carried out. The laser machining head is preferably configured to radiate a machining laser beam onto at least one workpiece in order to carry out a or the laser machining process.

A beam path of the radiation from the light source to the sensor may at least partially overlap and/or be coaxial with a beam path of the machining laser beam in the laser machining head. The beam path of the radiation from the light source to the sensor may extend, at least in sections, within the laser machining head and/or within the sensor module. Starting from the light source, the radiation may first propagate outside the laser machining head, then enter the laser machining head and propagate inside the laser machining head, then enter the sensor module and propagate inside the sensor module and finally be incident on the at least one sensor of the sensor module.

The light source may be a stabilized and/or adjustable and/or controllable light source. The light source may be or include at least one of: an electrical light source, a halogen lamp, a light-emitting diode, a superluminescent diode, and a broadband light source, in particular a light source with an emission spectrum between 350 nm and 2000 nm.

A stabilized light source may indicate a light source with constant emission characteristics or intensity. A stabilized light source may therefore indicate a light source with predetermined emission characteristics held constant or stable. A closed control loop may be provided for this purpose. The stabilized light source may therefore be a closed-loop controlled light source. The emission properties may indicate an intensity of the radiation emitted by the light source at a specified wavelength and/or in a specified wavelength range and/or an emission characteristic of the light source. By monitoring and controlling the emission properties of the light source, it can be ensured that the emission properties do not vary unintentionally due to environmental conditions, such as humidity or temperature, or due to the light source aging. This in turn can ensure that the emission properties of the light source have no influence on the evaluation of the beam guidance and detection properties of the laser machining system. In particular, the stabilized light source may be configured as a closed-loop controlled LED or closed-loop controlled halogen lamp.

Detecting the radiation may include detecting a radiation intensity of the radiation in a predetermined wavelength range or at a predetermined wavelength. The corresponding intensity signal may be generated based on the detected radiation intensity. The light source may be configured to emit radiation in the specified wavelength range or at the specified wavelength.

Detecting the radiation may include detecting a radiation intensity of the radiation in a plurality of predetermined wavelength ranges and/or at a plurality of predetermined wavelengths by corresponding photodiodes. Based thereon, corresponding intensity signals may be generated. The corresponding intensity signals may be compared with corresponding reference values.

The specified wavelength range may be or include at least one of the following wavelength ranges: a visible wavelength range, a near-infrared (NIR) wavelength range, an infrared wavelength range, a wavelength range of thermal radiation, a wavelength range of plasma radiation, wavelengths between 350 nm and 780 nm, wavelengths between 780 nm and 3 µm, wavelengths greater than 1 µm. The specified wavelength may be or include at least one of the following wavelengths: a wavelength of a laser source of the laser machining head, a wavelength in the range between 1030 nm and 1070 nm, preferably 1064 nm, a wavelength in the visible green spectral range, in particular in a range between 500 nm and 570 nm, preferably at 515 nm, a wavelength in the visible blue spectral range, in particular in a range from 400 nm to 500 nm, a wavelength in a range between 440 nm and 460 nm, preferably at 450 nm.

For example, the radiation intensity of the radiation may be detected by a first photodiode in a visible wavelength range, e.g. between 350 nm and 780 nm, and a first intensity signal may be generated, and/or the radiation intensity at a wavelength of the machining laser beam may be detected by a second photodiode of the laser machining system, e.g. at a wavelength in the range between 1030 nm and 1070 nm, preferably at 1064 nm, and a second intensity signal may be generated, and/or the radiation intensity in an infrared wavelength range, e.g. between 780 nm to 3 μm, may be detected and a third intensity signal may be generated. The first to third intensity signals may be compared to first through third reference values, respectively. The visible wavelength range may correspond to a spectral range of plasma radiation generated during a laser machining process. The infrared wavelength range may correspond to a spectral range of thermal radiation generated during the laser machining process. The alignment of the laser machining head and the light source relative to one another may be carried out in such a way that at least one of the first to third intensity signals assumes a maximum value.

The radiation emitted by the light source may be guided by the at least one optical element of the laser machining head or the sensor module and be transmitted or reflected by the at least one optical element during that. The optical element may be or comprise at least one of: a transmissive element, a reflective element, a protective glass, a beam splitter, a mirror, a lens, a lens group, a lens pack, a focusing lens (group), a collimating lens (group), and optics.

All of the aforementioned steps are preferably carried out with at least two laser machining heads of the same construction and with the same sensor module and the same light source. This allows beam guidance properties of a plurality of identical laser machining heads to be compared.

Alternatively or additionally, all of the aforementioned steps are carried out with the same laser machining head and the same light source and with at least two sensor modules of the same construction. This allows for the detection and beam guidance properties of a plurality of sensor modules of the same construction to be compared. For example, when replacing a first sensor module with a second sensor module of the same construction on a laser machining head including the first sensor module and the second sensor module, the method may be carried out on this laser machining head. In this way, beam guidance and detection properties of the first sensor module and of the second sensor module may be compared with one another and it can be ensured that the detected intensity signals are comparable.

Alternatively or additionally, all of the aforementioned steps are carried out repeatedly with the same laser machining head, with the same sensor module and the same light source at a predetermined time interval. In this way, properties of said laser machining system, in particular beam guidance and/or detection properties, can be compared at different points in time. Aging and/or contamination of the optical components, for example a protective glass, and/or the sensor may thus be detected. For example, the method may be carried out again on the same laser machining system during commissioning and/or during maintenance or after a certain period of time. The method may also be carried out during commissioning and/or maintenance of a laser machining system or after replacing at least one component of said laser machining system. The at least one component of the laser machining system may be, for example, a laser source, the sensor module, the sensor of the sensor module, the optical element of the laser machining head or the optical element of the sensor module.

The sensor module and the laser machining head are preferably arranged in a fixed and/or stationary manner relative to one another. For example, the sensor module and the laser machining head are attached to one another. In particular, the sensor module may be mounted on a housing of the laser machining head. A distance and an orientation of the sensor module and the laser machining head may particularly preferably be fixed relative to one another.

The laser machining head and the light source may be aligned with one another in particular in such a way that a center point of the light source is on an optical axis of the laser machining head, in particular on an optical axis of a focusing optics of the laser machining head, and/or that a central axis of the light source coincides with the optical axis of the laser machining head and/or the focusing optics. The central axis of the light source preferably designates the center axis or central axis of the emission cone of the light source. The alignment of the laser machining head and the light source relative to one another may in particular be performed in such a way that the center point of the light source is in a focal point of the focusing optics. Aligning the laser machining head and the light source with each other may also include adjusting the focal point of the focusing optics.

For this purpose, aligning the laser machining head and the light source with one another may include at least one of the steps of: adjusting a distance between the laser machining head and the light source, adjusting an orientation of the laser machining head and the light source with respect to one another, tilting the laser machining head and the light source with respect to one another, moving the laser machining head relative to the light source, moving the light source relative to the laser machining head, moving the laser machining head in a plane perpendicular to an optical axis of the laser machining head, moving the laser machining head in parallel to an optical axis of the laser machining head. The optical axis of the laser machining head may be or correspond to the optical axis of the focusing optics of the laser machining head.

The method can further comprise a step of aligning the sensor module with the laser machining head. Preferably, the sensor module is aligned such that the optical axis of the sensor module coincides, i.e. is coaxial, with the optical axis of an optical output of the laser machining head. The optical axis of the sensor module preferably designates the optical axis of an optical input of the sensor module through which radiation coupled out of the laser machining head enters the sensor module. The optical axis of the sensor module may be or correspond to the optical axis of a focusing lens system of the sensor module. The optical axis of the optical output of the laser machining head preferably designates the optical axis of the optical output through which radiation is coupled out of the laser machining head to the sensor module. Aligning the sensor module may include moving the sensor module relative to the optical axis of an optical output of the laser machining head, in particular tilting about the optical axis of the optical output and/or displacing in a plane perpendicular to the optical axis of an optical output of the laser machining head.

The method may further include a step of aligning the at least one photodiode in the sensor module. The at least one photodiode may be aligned by moving the photodiode relative to the optical axis of the sensor module. The at least one photodiode may be aligned in such a way that a detected intensity is at a maximum.

The method may further comprise providing the light source outside of the laser machining head. Providing the light source may include positioning the light source at a predetermined location, such as on a holder or on a workpiece. The predetermined position may correspond to a machining position on a workpiece. The machining position may correspond to a predetermined position for radiating a machining laser beam in a laser machining process. The light source may be fixedly installed or may be fixedly installed. In this case, aligning the laser machining head and the light source relative to one another may only be carried out by moving the laser machining head.

In an exemplary embodiment, the sensor module or the at least one photodiode may first be aligned relative to the laser machining head. This may be done, for example, with the help of a pilot laser that visualizes a focal position of the laser beam. A distance of the laser machining head or a focal position or a focal point of a machining laser beam or of the pilot laser may then be set to the light source. For this purpose, for example, an ideal working distance for a given laser optics of the laser machining head may be known. Then the laser machining head is preferably aligned in an XY plane perpendicular to the propagation direction of the machining laser beam with respect to the light source. For this purpose, the alignment of the laser machining head in the XY plane can be changed until a maximum signal is obtained from the sensor module or from the at least one photodiode.

The at least one reference value may include an upper and a lower reference value, i.e. a reference interval. Comparing the intensity signal to the reference value may include: comparing the mean value of the intensity signal to the reference value and/or determining whether the mean value of the intensity signal is within the reference interval. As an alternative to the mean value, the maximum value of the intensity signal may also be used.

Comparing the mean value of the intensity signal to a reference value may include determining the mean value of the intensity signal. The mean value of the intensity signal may be determined as the mean value of the intensity signal over time. The mean value may be an arithmetic mean value or a geometric mean value. Within the scope of this disclosure, the mean value may also be defined as a median. Determining the mean value may include: removing outliers of the intensity signal, i.e. removing the smallest and/or removing the largest values, and determining the mean value of the intensity signal based on the remaining values of the intensity signal.

The mean value of the intensity signal may be determined for a given laser machining head and a given sensor and/or a given sensor module. A scaling factor for this given laser machining head and this given sensor may be determined based on the mean value of the intensity signal determined in this way and on the reference value. As an alternative to the mean value, the maximum value of the intensity signal may also be used.

Determining the scaling factor may include determining a quotient between the mean value or the maximum value of the intensity signal and a reference value. Determining the quotient between the mean value or the maximum value of the intensity signal and the reference value may include dividing the mean value or the maximum value of the intensity signal by the reference value. Accordingly, the scaling factor may be dimensionless.

The reference value is preferably a mean value or a maximum value of an intensity signal that was determined by the previously described steps of detecting radiation and aligning the laser machining head for a reference laser machining system. The reference laser machining system may be of the same construction as the laser machining system under consideration.

The scaling factor may be stored for this laser machining head and this sensor. Storing may be performed by a control unit.

The intensity signal may be a one-dimensional signal variable over time. The intensity signal may be a digital signal. The intensity signal may include a plurality of signal values, each signal value being associated with a respective point in time. A signal value may correspond to the intensity of the radiation in the predetermined wavelength range or at the predetermined wavelength detected at the associated point in time. The photodiode may output an analog signal as the intensity signal, for example a current or voltage signal. The analog intensity signal may be converted into a digital signal by the sensor module or a control unit.

According to a further aspect of the present disclosure, a method for monitoring a laser machining process is provided, said method comprising: performing a laser machining process for machining at least one workpiece by radiating a machining laser beam onto the at least one workpiece using a laser machining head; detecting process radiation of the laser machining process by means of a sensor, preferably a photodiode, of a sensor module in a predetermined wavelength range and generating a corresponding intensity signal; scaling the intensity signal with a scaling factor determined for this laser machining head carrying out the laser machining process and this sensor, and monitoring the laser machining process using the scaled intensity signal and using at least one monitoring parameter predetermined for the intensity signal, or scaling at least one predetermined monitoring parameter for the intensity signal using the one scaling factor determined for this laser machining head and this sensor, and monitoring the laser machining process based on the intensity signal and based on the at least one scaled monitoring parameter. The scaling factor may have been determined as above.

Scaling the intensity signal may comprise dividing the intensity signal by the scaling factor. Scaling the monitoring parameter may comprise multiplying the monitoring parameter by the scaling factor.

A laser machining process may comprise machining the at least one workpiece by radiating a machining laser beam onto a predetermined machining area on the workpiece, for example along a predetermined machining path. The laser machining process may comprise laser welding, also called laser welding process. In this case, a weld may be formed by radiating the machining laser beam along the machining path. The laser machining process may alternatively or additionally comprise laser cutting, also called laser cutting process. In this case, a cutting edge may be formed by radiating the machining laser beam along the machining path. The laser machining process may also include a process of piercing into the at least one workpiece. In this case, the at least one machining area may correspond to a piercing hole. In this case, the piercing hole may be formed by radiating the machining laser beam onto the machining area.

The process radiation generated when carrying out the laser machining process may include at least one of: thermal radiation in the infrared wavelength range, plasma radiation in the visible wavelength range, and laser radiation reflected from the workpiece. The reflected laser radiation may be in the infrared wavelength range or in the visible wavelength range.

A laser machining process may define one or more process parameters to perform the machining as specified. The process parameters may include at least one predetermined machining area, a focal position, a laser power, a feed rate, a laser beam diameter and/or a distance and/or orientation of the laser machining head with respect to a workpiece. Process parameters such as the focal position, the feed rate, the laser power and/or the laser beam diameter may be specified for each given machining area and may be variable or constant.

The at least one monitoring parameter for the intensity signal may be selected from the group comprising: an upper envelope, a lower envelope, an upper threshold value, a lower threshold value, a reference curve, an average value. An error may be reported when the intensity signal is outside the envelopes or exceeds or falls below a threshold value.

By scaling the intensity signal and/or the respective at least one monitoring parameter, the intensity signals generated when carrying out the laser machining process by a plurality of identical laser machining systems can be compared between these laser machining systems. In this way, differences in the generated intensity signals between the laser machining systems of the same construction may be taken into account and compensated for.

In addition, to monitor the identical laser machining process, the same monitoring parameters or the same monitoring method or program may be used on all of the identical laser machining systems. In particular, the laser machining process may be monitored based on monitoring parameters that were determined for another laser machining system of the same construction as the laser machining system under consideration or that were determined for a reference laser machining system of the same construction. The laser machining process may be monitored, in particular, based on monitoring parameters that were determined for the reference laser machining system.

According to a further aspect of the present disclosure, a laser machining system is provided, comprising: a laser machining head configured to radiate a machining laser beam onto at least one workpiece to carry out a laser machining process, a sensor module including at least one sensor, preferably a photodiode-based sensor or a photodiode, for detecting an intensity of a process radiation in a predetermined wavelength range and/or at a predetermined wavelength, and a control unit configured to perform a method for comparing laser machining systems according to embodiments of the present disclosure and a method for monitoring a laser machining process according to embodiments of the present disclosure. The control unit may be configured to control the laser machining head, the sensor module, a laser source and/or the light source.

The laser machining system may be configured to perform the method for comparing laser machining systems and/or the method for monitoring the laser machining process according to embodiments of the present disclosure.

The laser machining system may include a laser source for generating the machining laser beam. The laser machining system may further include a light source as described above.

The laser machining head may be a laser welding head or a laser cutting head. The sensor module may be mounted or arranged on a housing of the laser machining head.

The at least one sensor may have a spectral sensitivity in a predetermined wavelength range and/or at a predetermined wavelength in order to detect a radiation intensity in the predetermined wavelength range and/or at the predetermined wavelength. The at least one sensor may only be sensitive at a specific wavelength or in a specific wavelength range. Alternatively, the at least one sensor may also be sensitive in a plurality of predetermined wavelength ranges or at a plurality of predetermined wavelengths.

The sensor may be further configured to output an intensity signal based on the detected process radiation or on the detected radiation of the light source according to embodiments of the present disclosure. The control unit may be configured to receive an intensity signal from the at least one sensor or from the sensor module.

Preferably, the sensor module comprises a first photodiode configured to generate a first intensity signal based on the detected radiation intensity in a visible wavelength range and/or a second photodiode configured to generate a second intensity signal based on the detected radiation intensity at a wavelength of the machining laser beam of the laser source, and/or a third photodiode configured to generate a third intensity signal based on detected radiation intensity in a near-infrared or infrared wavelength range.

The sensor module may be mounted or arranged on a housing of the laser machining head. The laser machining head may include an outcoupling element, for example a beam splitter, for coupling process radiation or radiation emitted by the light source out of the beam path of the machining laser beam. The laser machining head may include an optical output for coupling out radiation, in particular process radiation or radiation emitted by the light source, and the sensor module may include an optical input for coupling in the radiation coupled out of the laser machining head. The sensor module is preferably attached to the laser machining head in such a way that the optical input of the sensor module and the optical output of the laser machining head are (optically) connected to one another. The position of the outcoupling element in the laser machining head preferably corresponds to a position of the optical output of the laser machining head for coupling radiation out of the laser machining head. The radiation, in particular the process radiation or the radiation emitted by the light source, may therefore propagate between the workpiece or the light source and the at least one sensor at least partially within the laser machining head and/or overlapping with the machining laser beam.

The laser machining head may be configured as a so-called fixed optics laser machining head or as a so-called scanner laser machining head. The scanner laser machining head may include a deflection unit for deflecting the machining laser beam and the excitation beam on a workpiece. The deflection unit may include scanner optics, a scanner system, a scanner mirror and/or a galvano scanner. In the fixed optics laser machining head, the machining laser beam may be moved relative to a workpiece by moving the laser machining head itself or the workpiece may be moved relative to the laser machining head.

The machining laser beam generated by the laser source may have a wavelength in the infrared spectral range, in particular in a range between 1030 nm and 1070 nm, preferably 1064 nm, or in the visible green spectral range, in particular in a range between 500 nm and 570 nm, preferably at 515 nm, or in the visible blue spectral range, in particular in a range from 400 nm to 500 nm, or in a range between 440 nm and 460 nm, preferably at 450 nm.

BRIEF DESCRIPTION OF THE DRAWINGS

The invention is described in detail below with reference to figures, wherein.

DETAILED DESCRIPTION OF THE INVENTION

Unless otherwise noted, the same reference symbols are used below for elements that are the same or have the same effect.

Figure 1:
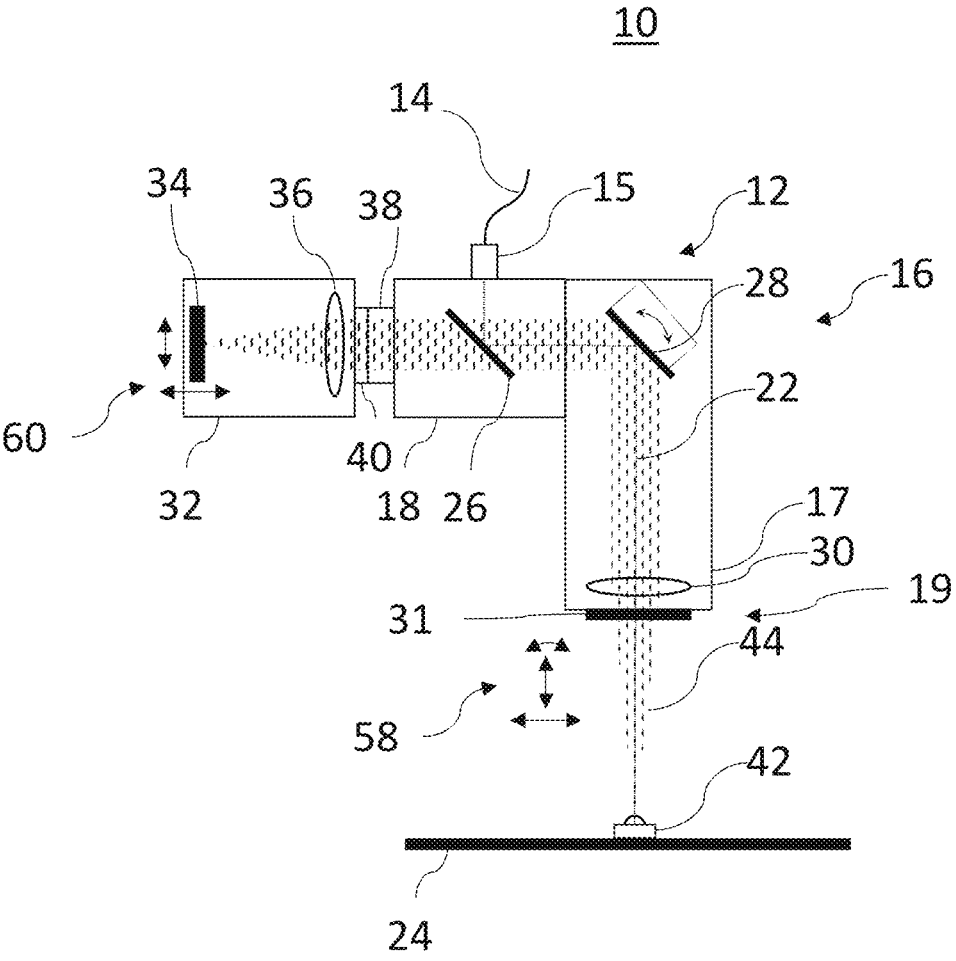
FIG. 1 shows a schematic diagram of a laser machining system for performing a laser machining process according to embodiments.

FIG. 1 shows a schematic diagram of a laser machining system for performing a laser machining process according to embodiments.

The laser machining system 10 includes a laser machining head 12, a sensor module 32 and a control unit (not shown). Embodiments are described below wherein the laser machining head 12 is configured as a welding head and wherein the laser machining system 10 is configured to carry out a laser welding process. However, the present disclosure is not limited thereto. The laser machining head 12 may also be configured as a cutting head, for example, and the laser machining system 10 may be configured to carry out a laser cutting process. The laser machining system 10 may also be referred to as equipment for short.

As shown, the laser machining head 12 is modular. The laser machining head 12 includes a main module 16 with a housing 17. The laser machining head 12 also includes a coupling module 18 for coupling a laser beam (not shown) into the laser machining head 12. However, the present disclosure is not limited thereto.

The laser machining head 12 may include further modules not shown. For example, the laser machining head 12 may include a camera module between the coupling module 18 and the sensor module 32 for capturing an image of a surface of a workpiece 24.

The laser machining system 10 may also include a laser source (not shown) for generating the laser beam, also referred to as a machining laser beam or machining beam for short. The laser source may generate the laser beam with a wavelength of 1064 nm, for example. The laser beam may be guided from the laser source to the laser machining head 12 via an optical fiber 14.

One end 15 of the optical fiber 14 is connected to the coupling module 18 of the laser machining head 12, e.g. via a fiber coupler, in order to couple the laser beam into the coupling module 18. The laser beam coupled into the coupling module 18 then propagates from the coupling module 18 into the main module 16 and emerges from the main module 16 via an outlet opening 19 from the laser machining head 12 in order to be directed onto a workpiece 24. The main module 16 may also include a nozzle (not shown) at the outlet opening 19.

According to further embodiments not shown, the coupling module 18 may also be arranged on an upper side of the main module 16, or it may be omitted. In this example, the laser beam is coupled into the main module 16 directly from the laser source or the end 15 of the optical fiber 14.

In FIG. 1, the (theoretical) beam path of the laser beam is illustrated by reference symbol 22. Within the laser machining head 12, the laser beam propagates from the light source or the end 15 of the optical fiber to the outlet opening 19 of the laser machining head 12 and is then radiated onto the workpiece 24 in order to carry out a laser machining process, for example a laser welding process.

The laser machining head 12 includes at least one optical element for guiding the laser beam. The at least one optical element for guiding the laser beam may also be referred to as beam guiding optics. For example, a focusing optics 30 is provided to focus the laser beam onto the workpiece 24 and a collimating optics (not shown) is provided for collimating the laser beam. Furthermore, the laser machining head 12 includes a deflection unit 28 for deflecting the laser beam on the workpiece 24 and an outcoupling element 26, e.g. a beam splitter. The outcoupling element 26 is described below using the example of the beam splitter, but is not limited to a beam splitter. In the example shown in FIG. 1, the outcoupling element 26 is arranged between the optical output 38 of the laser machining head and the deflection unit 28, but is not limited to this position. The outcoupling element 26 may also be arranged between the focusing optics 30 and the deflection unit 28. The outcoupling element or the beam splitter 26 is used to couple light or radiation that enters the laser machining head 12 via the outlet opening 19 out of the beam path of the machining laser beam, for example process radiation (not shown) generated during the laser machining process and/or radiation emitted from a light source 42 for inspection. The beam splitter 26 may be configured as a dichroic mirror, for example.

A light source 42, which is described in detail below, is provided for inspection of the laser machining system, in particular the laser machining head 12 and/or the sensor module 32. The laser machining head 12 may include further optical elements for beam guidance. For example, the laser machining head 12 preferably includes a protective glass 31 at the outlet opening 19 of the laser machining head 12 in order to protect the interior of the laser machining head 12 from dirt, smoke, splashes, etc. generated during the laser machining process.

The laser machining head 12 may be configured as a so-called fixed optics laser machining head or as a so-called scanner laser machining head. In FIG. 1, the laser machining head 12 is configured as a scanner laser machining head. The scanner laser machining head has includes movable deflection unit 28 for deflecting the laser beam relative to the workpiece 24 and for radiating the laser beam along a machining path on the workpiece 24. The deflection unit 28 may include a scanner optics, a scanner system, a scanner mirror and/or a galvano scanner. In the fixed optics laser machining head, the laser beam may be moved relative to the workpiece 24 by moving the laser machining head 12 itself, or the workpiece 24 is moved relative to the laser machining head 12.

When the machining laser beam is radiated onto the workpiece 24 in order to carry out the laser machining process, process radiation (not shown) is generated, emitted by the workpiece 24 and enters the laser machining head. The process radiation includes radiation in the visible wavelength range, in particular emitted plasma radiation, radiation in the infrared wavelength range, in particular emitted infrared or thermal radiation, and laser radiation of the radiated machining laser beam reflected by the workpiece 24. After entering the laser machining head 12 or the sensor module 32 and before being incident on the sensor 34, the process radiation may have essentially the same beam path as the radiation 44 of the light source 42 shown in FIG. 1. However, the present disclosure is not limited thereto.

In the embodiment shown in FIG. 1, part of the radiation 44 from the light source 42 enters the laser machining head 12 via the outlet opening 19 and extends in the laser machining head 12 overlapping with the (theoretical) beam path of the machining laser beam. The radiation 44 of the light source 42 is coupled out of the beam path of the machining laser beam by the beam splitter 26 so that it enters the sensor module 32 and is incident on the sensor 34. The laser machining head 12 includes an optical output 38 for coupling out the process radiation or the radiation 44 emitted by the light source 42 and the sensor module 32 includes an optical input 40 for coupling in the radiation coupled out of the laser machining head 12. The radiation 44 emitted by the light source 42 propagates between the workpiece 24 and the sensor 34 at least in sections within the laser machining head 12 and/or overlapping with the (theoretical) beam path of the machining laser beam.

The part of the process radiation entering the laser machining head 12 or of the radiation 44 emitted by the light source 42 is also guided via the beam guiding optics for the machining laser beam as it propagates through the laser machining head 12. This may include reflecting or transmitting the radiation. For example, the radiation may be shaped by the focusing optics 36 for the machining laser beam and reflected or deflected by the deflection unit 26. Furthermore, the radiation passes through the beam splitter 26 before entering the sensor module 32. In the sensor module 32, the radiation is focused by the focusing optics 36 and is then incident on the sensor 34. In FIG. 1, the radiation passes through the beam splitter 26. However, the beam splitter 26 may also be configured in such a way that the radiation is reflected at the beam splitter 26. In this case, the position of the optical fiber end 14 and the position of the sensor module 32 are reversed.

In FIG. 1 the machining laser beam is reflected or deflected at the beam splitter 26 and the process radiation or the radiation 44 emitted by the light source 42 is transmitted through the beam splitter 26. However, the present disclosure is not limited thereto.

The sensor module 32 includes at least one sensor 34 configured to detect or measure a radiation intensity of the process radiation in a predetermined wavelength range or at a predetermined wavelength and to generate and output an intensity signal based thereon. The at least one sensor 34 therefore has a spectral sensitivity in the predetermined wavelength range or at the predetermined wavelength. The at least one sensor 34 may be configured as a photodiode or as a photodiode or pixel array. The intensity signal is a one-dimensional signal variable over time. A signal at a given point in time corresponds to the radiation intensity detected at this point in time.

The intensity signal output by the sensor 34 may be an analog signal and the control unit may be configured to convert the analog signal into a digital signal.

According to an embodiment (not shown), the sensor module comprises a first sensor for detecting a radiation intensity in the visible wavelength range corresponding to the plasma radiation, a second sensor for detecting a radiation intensity at a wavelength of the machining laser beam corresponding to the reflected laser radiation, and a third sensor for detecting a radiation intensity in an infrared wavelength range corresponding to the thermal radiation, wherein the three sensors generate and output corresponding first to third intensity signals. In order to direct the process radiation entering the sensor module onto the first to third sensors, the sensor module may include a plurality of beam splitters.

The control unit is connected to the sensor module 32 and receives the intensity signal from the at least one sensor 34. The control unit may be configured to record the intensity signal. Control unit 16 is configured to control laser machining system 10, in particular the sensor module 32, the at least one sensor 34, the light source 42 and/or the laser machining head 12, in order to perform a method for comparing laser machining systems and a method for monitoring a laser machining process in accordance with to embodiments of the present disclosure. In particular, the control unit is configured to monitor and control the laser machining process based on the intensity signal of the at least one sensor 34.

A laser welding process is used below as an example of the laser machining process. However, the present disclosure is not limited thereto. The laser machining process may also be a laser cutting process.

According to embodiments of the present disclosure, when monitoring a laser welding process during laser welding, the level and shape of the generated intensity signal are usually evaluated. During the laser machining process, the radiation intensity of the process radiation is detected by the at least one sensor 34 of the sensor module 32 in a predetermined wavelength range or at a predetermined wavelength and a corresponding intensity signal is generated.

The laser machining process is monitored using the intensity signal and at least one associated monitoring parameter. The monitoring parameter may include, for example, an upper envelope, a lower envelope, an upper threshold, a lower threshold, a reference curve, etc. For example, the intensity signal is compared to predetermined envelopes and/or threshold values and an error is reported when the intensity signal is outside the envelope or exceeds or falls below a threshold value. Comparing and reporting the error may be performed by the control unit, for example. In laser welding, evaluating the process radiation allows for a qualitative statement to be made about the quality of a weld seam.

As described above, according to an embodiment, a first intensity signal based on a detected radiation intensity of the process radiation in a visible wavelength range for detecting the plasma radiation, a second intensity signal based on a detected radiation intensity of the process radiation at a wavelength of the machining laser beam for detecting the reflected laser radiation, and a third intensity signal based on a detected radiation intensity of the process radiation in an infrared wavelength range of the process radiation for detecting the thermal radiation are generated.

Figure 2:
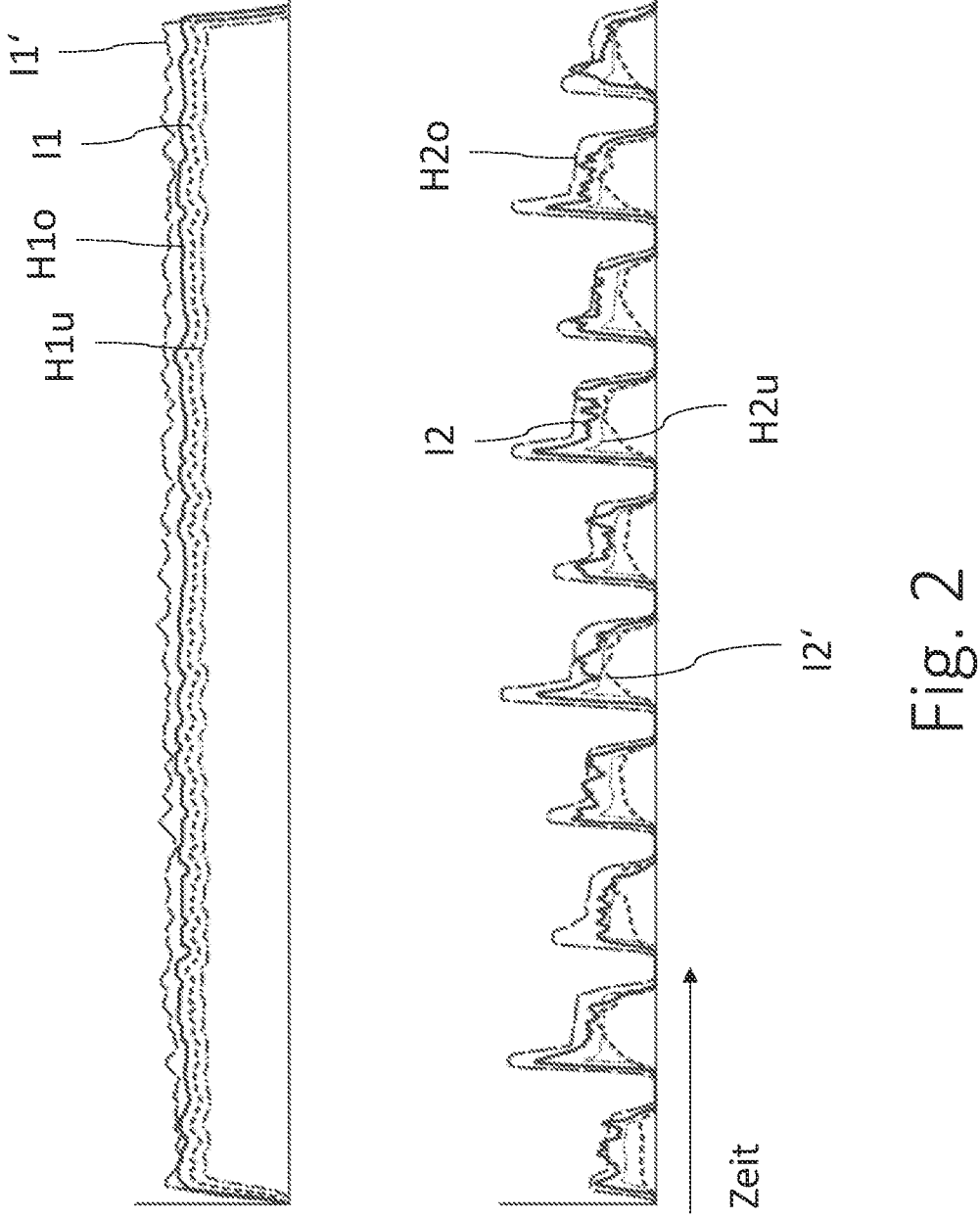
FIG. 2 shows a time profile of intensity signals for a specified laser welding process and corresponding upper and lower envelope curves.

FIG. 2 shows a time profile of intensity signals of a process radiation for a specified laser welding process and corresponding reference curves. The example above shows an intensity signal of the plasma radiation when welding stainless steel to stainless steel. The example below shows an intensity signal of the back reflection in a pulse weld of stainless steel to stainless steel. The deviation of the intensity signals from the reference curves is evaluated for monitoring the laser welding process, for example for monitoring the welding of a workpiece.

The upper part of FIG. 2 shows an intensity signal I1 that was generated by a laser machining system when this laser welding process was carried out. Furthermore, upper and lower envelopes H1o, H1u are drawn as reference curves. In the case of the intensity signal I1, the signal level of the intensity signal I1 is compared with the signal level of the upper and lower envelopes H1$o$, H1$u$ and an error is output when the signal level of the intensity signal I1 is below the signal level of the lower envelope H1$u$ or falls below it or when the signal level of the intensity signal I1 is above or exceeds the signal level of the upper envelope H1$o$. The last case is illustrated in FIG. 2 by the intensity signal I1'. To compare the signal level, for example, a mean value of the intensity signal I1 over time may be compared with a mean value of the envelopes H1$o$, H1$u$ over time.

In the lower part of FIG. 2 there is another intensity signal I2 which was also generated by the laser machining system when carrying out the laser welding process. Furthermore, upper and lower envelopes H2$o$, H2$u$ are drawn as reference curves. In the case of the intensity signal 12, the signal shape of the intensity signal I2 is compared with the signal level of the upper and lower envelopes H2$o$, H2$u$ and an error is output when the signal shape of the intensity signal I2 deviates too much from the waveform defined by the upper and lower envelopes H2$o$, H2$u$. This case is illustrated in FIG. 2 by the intensity signal I2'.

So-called reference parameters may be used to compare the signal forms. A possible reference parameter is the integral under the signal curve. When the integral of the reference curve and that of the currently detected signal curve deviate from each other, an error may be reported. Another example of a reference parameter is the 'area error'. This is determined by the area that is created between the currently detected signal curve and the reference curves. It is therefore a measure at which the points and how far the currently detected signal curve lies outside the reference curves.

The inventors have recognized that the spectral distribution of the detected radiation intensity of the process radiation, which is detected by the sensor 34, is largely dependent on the beam guidance properties of the beam guiding optics of the laser machining head 12 and the sensor module 32, which guide the process radiation, and the detection properties of the sensor 34.

The beam guiding optics are subject to certain manufacturing tolerances or quality fluctuations. In addition, the beam guiding optics may age and become soiled over time. The sensor is also subject to manufacturing tolerances, aging effects and soiling. Accordingly, the reflection or transmission spectra of the beam guiding optics and the spectral sensitivity of the sensor may differ and change over time, even for elements of the same construction. Consequently, the detected radiation intensity of the process radiation at the predetermined wavelength or in the predetermined wavelength ranges and thus the level of the corresponding intensity signal may differ between laser machining systems of the same construction or between different points in time in the same laser machining system. Even small differences in two beam guiding optics or sensors of the same construction may lead to significant changes in the signal level and shape.

These influences of the beam guidance optics and the sensor lead to large differences in the generated intensity signals. In particular, the signal level and the signal shape of the generated intensity signals may differ and change over time. This in turn makes it difficult to compare the intensity signals from system to system. In addition, the detection of errors in the monitored laser machining processes can no longer be guaranteed. Especially in industrial series production, a plurality of systems of the same construction are usually used. Here, the comparability of the systems of the same construction is of particular importance.

On the other hand, the process parameters of a given laser machining process, for example laser parameters such as laser power etc., or system parameters, i.e. parameters of mechanical components of the laser machining system or the laser machining system, e.g. a robot arm guiding the laser machining head, also have a strong influence on the detected radiation power and thus on the generated intensity signals. For example, due to differences in the positioning or the size of such components, the signal intensities, i.e. the values of the intensity signals, may vary from system to system since this has an impact on the reflected radiation power of the laser. Accordingly, it is important to be able to distinguish the above-mentioned influence of the beam guidance and detection properties of the laser machining system from the influence of the process parameters.

Overall, the comparability of the generated intensity signals plays a major role for the comparability of identical systems with each other and for the quality of process monitoring, i.e. for the evaluation of the intensity signals. It is therefore necessary to be able to evaluate and compare the beam guidance and detection properties of laser machining systems.

Therefore, according to the present disclosure, a light source 42 (see FIG. 1) is used for inspection. The light source 42 may be part of the laser machining system 10.

The light source 42 is arranged outside of the laser machining head 12 and may be arranged, for example, on a workpiece 24 or a holder at a predetermined position corresponding to a machining position or a machining area of a specified laser machining process. However, the present disclosure is not limited thereto. The light source 42 is preferably fixedly installed. More preferably, the light source 42 emits radiation or light with a spectrum that corresponds to or includes the spectrum of the process radiation of a laser machining process. The light source 42 preferably emits light in the visible wavelength range corresponding to the plasma radiation, in the infrared wavelength range corresponding to the thermal radiation and at a wavelength of the machining laser beam.

The light source 42 is configured, for example, as a broadband LED or halogen lamp and is preferably a stabilized or closed-loop controlled light source. The closed-loop control may be carried out by the control unit of the laser machining system 10 or by a separate control unit. The closed-loop control includes monitoring the emission properties of the light source 42 such as the emission spectrum and the radiation properties and closed-loop controlling the light source such that the emission properties of the light source 42 are kept constant and therefore stable. This ensures that the emission properties do not vary unintentionally due to environmental conditions such as temperature etc. or due to the light source aging. This in turn may ensure that the emission properties of the light source 42 have no influence on the evaluation of the beam guidance and detection properties of the laser machining system 10. The emission properties include, in particular, the emission spectrum, i.e. the spectral distribution of the emitted radiation intensity, and the radiation properties, i.e. the angular distribution of the emitted radiation.

A closed-loop control circuit may be provided so that the emission properties of the light source 42 are constant over the service life of the light source 42 and are not influenced by temperature changes, and so that in particular the emitted radiation intensity is constant. The closed-loop control circuit may be implemented by the control unit. The closed-loop control circuit may be configured to increase a drive current of the light source 42 when the efficiency of the light source 42 decreases in order to keep the emitted radiation intensity at a constant level. For example, an LED is used as the light source 42 and the closed-loop control circuit includes a photodiode for detecting the radiation intensity emitted by the LED. The photodiode is connected to an amplifier circuit of the control circuit. The drive current of the LED is adjusted depending on the detected radiation intensity. When the detected radiation intensity decreases, the drive current of the LED is increased. In order to detect the radiation intensity of the LED via the photodiode, the closed-loop control circuit also includes a partially transparent mirror through which part of the radiation intensity emitted by the LED is deflected onto the photodiode. The photodiode may output a current based on the detected radiation intensity. An operational amplifier of the amplifier circuit may be connected to the photodiode and serve as a voltage converter. The operational amplifier and the photodiode may be formed as a single component.

Figure 3:
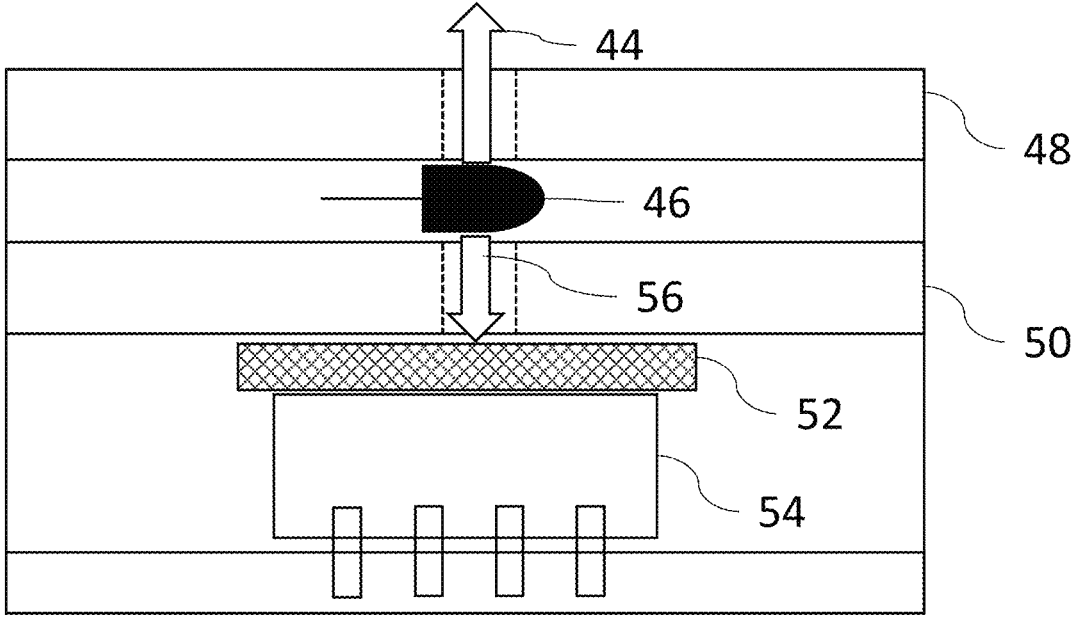
FIG. 3 shows a schematic view of a light source according to embodiments of the present disclosure.

FIG. 3 shows a light source according to embodiments of the present invention.

The light source 42 comprises a halogen lamp 46 arranged between a first aperture 48 and a second aperture 50. The first aperture 48 may be positioned above the halogen lamp 46 and the second aperture 50 may be positioned below the halogen lamp 46, but the present disclosure is not limited thereto.

A filter 52 is preferably arranged on the side of the second closed-loop control 50 facing away from the light-emitting diode 42. The filter 52 has a transmissivity of 50% of the radiation emitted by the halogen lamp 46. However, the present disclosure is not limited thereto. The filter 52 may have a different transmissivity or may be omitted. Furthermore, the light source 42 includes a photodiode 54 with an operational amplifier, which is arranged on the side of the second aperture 50 facing away from the light-emitting diode 42 or on the side of the filter 52 facing away from the second aperture 50. The second aperture 50 limits the ratio of the emitted radiation 56 reaching the photodiode 54 from the light source 42.

The laser machining head 12 (see FIG. 1) is arranged on the side of the first aperture 48 facing away from the light-emitting diode 42. The first aperture 48 limits the ratio of the emitted radiation 44 which travels from the light source 42 in the direction of the laser machining head 12 and is detected by the sensor 34.

By providing the light source 42, there is no need for a laser machining process for generating process radiation for evaluating the beam guidance and detection properties to be performed. In addition, the (stabilized) light source 42 offers the advantage of providing a basis or constant calibration for comparing the laser machining systems 10. The comparison is independent of the influencing factors mentioned above, such as the process parameters or laser parameters of a laser beam source.

Figure 4:
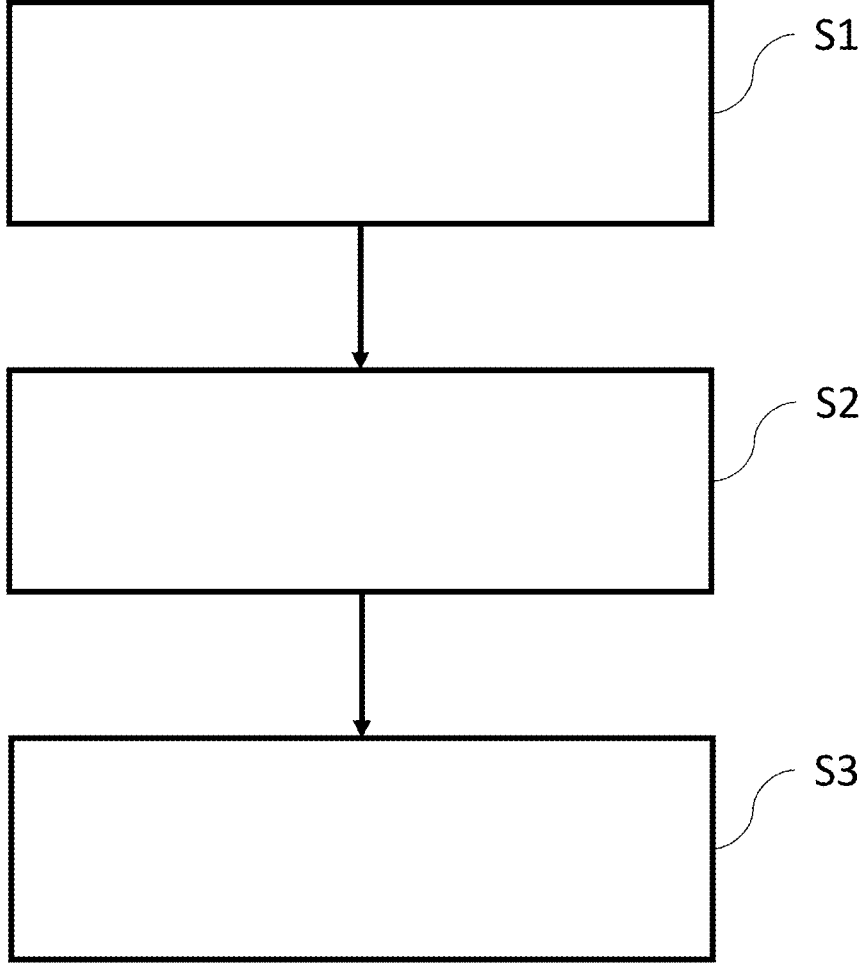
FIG. 4 shows a flow diagram of a method for comparing laser machining systems according to embodiments.

FIG. 4 shows a flow chart of a method for comparing laser machining systems according to embodiments. The method may be performed by the laser machining system 10 described with reference to FIG. 1.

The method for comparing laser machining systems comprises, as a first step (S1), that the sensor 34 detects radiation 44 emitted by the light source 42 in a predetermined wavelength range or at a predetermined wavelength and generates a corresponding intensity signal.

The radiation 44 propagates from the light source 42 to the sensor 34 through the laser machining head 12 and the sensor module 32.

As the radiation 44 travels through the laser machining head 12 or through the sensor module 32, the radiation 44 emitted by the light source 42, like the process radiation, is deflected by at least one optical beam guiding system of the laser machining head 12, for example the deflection unit 28, the beam splitter 24, the focusing optics 30, and is guided by at least one beam guiding optics of the sensor module 32, for example the focusing optics 36. As previously discussed with reference to the process radiation, the spectral distribution of the detected radiation intensity of the radiation 44 is also influenced by the beam guidance properties of the beam guiding optics of the laser machining head 12 and the sensor module 32 and by the sensor 34 of the sensor module 32.

The method also comprises aligning the laser machining head 12 and the light source 42 with one another so that the radiation intensity detected by the sensor 34 and thus the corresponding intensity signal assumes a maximum value (S3).

In addition, the sensor module 34 and the laser machining head 12 may first be aligned relative to one another. For example, an optical axis of the sensor module 34 may be aligned with an optical axis of the optical output 38 of the laser machining head 12. In particular, the optical axis of the optical input 40 of the sensor module 32 may be aligned with the optical axis of the optical output 38 of the laser machining head 12 so that the optical axis of the optical input 40 of the sensor module 32 coincides with the optical axis of the optical output 38 of the laser machining head 12.

The laser machining head 12 and the light source 42 may then be aligned with one another in order to detect the maximum of the intensity signal. For this purpose, the laser machining head 12 and the light source 42 may be aligned with one another such that a center point of the light source 42 is on an optical axis of the laser machining head 12. In particular, the center of the light source 42 may be on the optical axis of the focusing optics 30. In addition, aligning may be performed in such a way that a central axis of the light source 42 coincides with the optical axis of the laser machining head, in particular with the optical axis of the focusing optics 30.

Aligning may also be performed in such a way that the center point of the light source 42 is in a focus of the focusing optics 30 of the laser machining head 12 or the focusing optics 36 of the sensor module 32.

For this purpose, for example, the laser machining head 12 and/or the light source 42 may be moved both in a plane perpendicular to the optical axis of the focusing optics 30 and along the optical axis of the focusing optics 30. Furthermore, a distance between the laser machining head 12 and the light source 42 may be adjusted and an orientation between the laser machining head 12 and the light source 42 may be adjusted. For example, the laser machining head 12 and the light source 42 may be tilted relative to one another. These adjustment options are illustrated in FIG. 1 by the double arrows 58.

Furthermore, the sensor 34 of the sensor module 32 may be aligned in such a way that the radiation 44 coupled into the sensor module 32 and focused onto the sensor 34 is detected by the sensor 34 substantially completely. For this purpose, the sensor 34 may be aligned such that a center point of the sensor 34 is on the optical axis of the focusing optics 36 and that a central axis of the sensor 34 coincides with the optical axis of the focusing optics 36. For this purpose, the sensor 34 may be moved both in a plane perpendicular to and along the optical axis of the focusing optics 36. This is illustrated by the double arrows 60 in FIG. 1.

According to embodiments, the light source 42 is fixedly installed. In this case, aligning may be performed simply by moving the laser machining head 12 together with the sensor module 32 attached to it.

Aligning the laser machining head 12 and the light source 42 with one another is intended to ensure that a maximum of the radiation intensity of the emitted radiation enters the laser machining head 12 or the sensor module 32 so that the intensity signal assumes a maximum value.

According to the embodiment described above first to third intensity signals are generated. In this case aligning of the laser machining head 12 and of the light source 42 with one another may be performed such that at least one of the first to third intensity signals attains a maximum value.

According to the present disclosure, the signal capture thus takes place after an exact alignment of the light source 42 with respect to the optical axis. A center of the light source 42 is aligned with the optical axis in such a way that a maximum of the intensity signals in the plasma, temperature and back reflection is achieved.

As a final step, the method comprises comparing the intensity signal with a predetermined reference value (S3). For example, a mean value of the generated intensity signal over time may be compared with a reference value. Alternatively or additionally, the maximum value of the intensity signal may be compared with the reference value. According to embodiments, the reference value is a mean value or a maximum value of an intensity signal that was determined by steps S1, S2 described above for a reference laser machining system, the reference laser machining system being of the same construction as the laser machining system under consideration.

By detecting radiation from a light source, by aligning the laser machining head to the light source so that the intensity signal assumes a maximum value, and by comparing the intensity signal with reference values, a comparison of laser machining systems of the same construction is made possible. It is not necessary to carry out a laser machining process.

On the one hand, steps S1-S3 may be carried out the first time with a first laser machining system and steps S1-S3 may be carried out with a second laser machining system that is of the same construction as the first laser machining system. The respective intensity signals for each of the laser machining systems of the same construction are compared with the same reference values. In this case, laser machining systems of the same construction means that the laser machining systems have laser machining heads of the same construction and sensor modules of the same construction. Based on the results of the comparison, it may then be decided in a further step whether, for example, mechanical or optical changes to the structure, for example a replacement or a changed position of optical or mechanical components, are necessary for at least one of the laser machining systems and/or an adjustment of parameters in a control or monitoring software of the control unit, for example smaller offsets to compensate for different signal levels of the intensity signals, must be carried out in order to ensure the comparability of the laser machining systems 10 of the same construction with one another.

For example, steps S1-S3 may be carried out with at least two laser machining heads of the same construction and with the same sensor module and the same light source. The sensor module may be successively mounted on the at least two identical laser machining heads. As a result, the beam guidance properties of the optical elements of a plurality of laser machining heads of the same construction may be compared with one another. Here, the influences on the beam guidance and detection properties of different sensor modules on the detected radiation intensity and thus the generated intensity signal are eliminated.

Alternatively or additionally, steps S1-S3 may be carried out with the same laser machining head and the same light source and with at least two sensor modules of the same construction. This allows the detection and beam guidance properties of a plurality of sensor modules of the same construction to be compared. Here, the influences on the beam guidance and detection properties of the sensor modules on the detected radiation intensity and thus the generated intensity signal are eliminated by laser machining heads of the same construction. This procedure may be useful, for example, when replacing a sensor module on a laser machining head with a sensor module of the same construction in order to be able to compare the generated intensity signals between the sensor modules of the same construction.

Alternatively or additionally, steps S1-S3 may also be carried out several times with the same laser machining head, with the same sensor module and the same light source and/or may be repeated with a predetermined time interval. As a result, properties of this laser machining system, in particular beam guidance and/or detection properties thereof, may be compared at different points in time. Aging and/or soiling of the beam guiding optics, for example the protective glass 31 of FIG. 1, and/or the sensor may thus be detected. For example, the method may be carried out during commissioning and/or maintenance of the laser machining system and/or after replacing at least one component of the laser machining system. The at least one component of the laser machining system may be, for example, the laser source, the sensor module, the sensor of the sensor module, a beam guiding optics of the laser machining head, for example the focusing optics 30 shown in FIG. 1 or the protective glass 31, or a beam guiding optics of the sensor module, for example the focusing optics 36 shown in FIG. 1.

In addition, the matching of the intensity signal to a laser machining system is useful as a quality check before the start of a laser machining process and thus the start of the detection of the process radiation. In this way, for example, major damage or changes, such as soiled protective glasses or the like, can be detected. Based on the intensity signal generated when the laser machining system is commissioned, it may be determined whether the maximum of the intensity signal can be reached with unchanged software/hardware settings in the software. During commissioning by a technician at the customer's site, any laser machining system that works in the visible to the NIR wavelength range may be tested independently of the process using the method and the light source.

Figure 5:
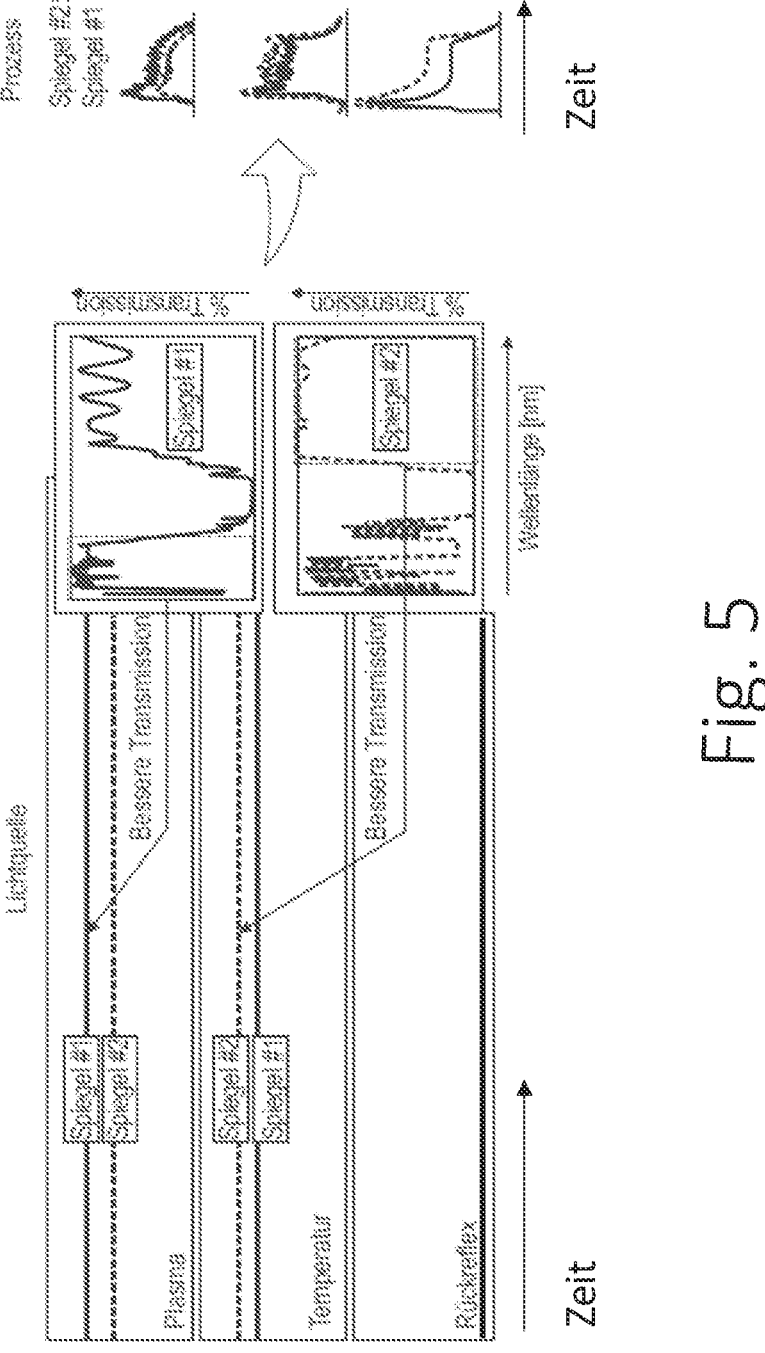
FIG. 5 shows intensity signals generated using a method for comparing laser machining systems according to embodiments of the present disclosure.

FIG. 5 shows intensity signals generated using the method according to embodiments of the present disclosure and intensity signals recorded when monitoring a laser machining process.

On the left side of FIG. 5, first to third intensity signals based on a detected radiation intensity in the visible wavelength range corresponding to a plasma radiation ("plasma"), based on a detected radiation intensity at a wavelength of the machining laser beam ("back reflection"), and based on of a detected wavelength in the infrared wavelength range corresponding to a thermal radiation ("temperature") obtained through steps S1-S3 described above ("light source") are shown.

The first to third intensity signals were recorded for two examples of the laser machining system 10 of the same construction from FIG. 1 by corresponding sensors of the sensor module. The two copies of the laser machining system of the same construction have two beam splitters 26 "mirror #1", "mirror #2" of the same construction installed. As can be seen, however, the two beam splitters 26 have slightly different transmission spectra or curves ("wavelength", "transmission" diagrams). For example, the transmissivity of the beam splitter "mirror #1" in the visible wavelength range is greater than that of the beam splitter "mirror #2" and the transmissivity of the beam splitter "mirror #2" in the infrared wavelength range is greater than that of the beam splitter "mirror #1".

Accordingly, a signal level of the "plasma" intensity signal for the laser machining system with the beam splitter mirror #1 is greater than a signal level of the "plasma" intensity signal for the laser machining system with the beam splitter "mirror #2". Conversely, a signal level of the "temperature" intensity signal for the laser machining system with the beam splitter mirror #2 is greater than a signal level of the "temperature" intensity signal for the laser machining system with the beam splitter "mirror #1". The different transmission curves of the beam splitters otherwise of the same construction show significant changes in the signal level of the respective intensity signals.

These differences recorded by the method with the light source are also evident in a typical laser welding process, as illustrated in FIG. 5 on the right side ("process"). Accordingly, the differences or tolerances of the beam splitters otherwise of the same construction also have an impact on the radiation intensity detected during the laser welding process and thus also on the intensity signals generated. When the differences in the intensity signals of the two laser machining systems of the same construction are not taken into account or corrected, this may lead to errors in the monitoring of the laser welding processes.

The method described above also makes it possible to subsequently determine a scaling factor for a specified laser machining head and a specified sensor of a specified sensor module. The scaling factor may then be stored in the monitoring software. The scaling factor makes it possible to set the signal level of an intensity signal that occurs during a laser machining process based on the detected radiation intensity to a predetermined value or a predetermined signal level. When the process is repeated on the same laser machining system when a sensor is replaced, it can be ensured that the signal levels of the individual sensors are comparable, and the parameterization of the software is therefore no longer necessary or becomes significantly simpler.

The scaling factor may be determined by dividing the mean value over time or the maximum value of the intensity signal generated in steps S1-S3 by the corresponding reference value.

According to embodiments, the laser machining system is configured to scale the intensity signal generated while a laser machining process is monitored using the scaling factor determined in this way and to monitor the laser machining process as described above using the scaled intensity signal. Scaling the intensity signal may include dividing the intensity signal by the scaling factor.

By scaling the intensity signal, the same monitoring parameters or the same monitoring method or program can be used on all of the laser machining systems of the same construction to monitor an identical laser machining process. In particular, the laser machining process may be monitored based on monitoring parameters that were determined for another laser machining system that is of the same construction as the laser machining system under consideration or that were determined for a reference laser machining system of the same construction. The laser machining process may be monitored, in particular, based on monitoring parameters that were determined for the reference laser machining system.

According to the embodiment described above, when the specified sensor module comprises first to third sensors, three corresponding scale factors may be determined. For example, a first scaling factor may be determined for the first sensor, a second scaling factor for the second sensor, and a third scaling factor for the third sensor.

In the present disclosure, a method for a machine quality inspection or for an inspection of diode-based sensor systems is provided, in which, using a light source, preferably a stabilized light source, and a photodiode-based sensor module, the beam guidance properties, in particular transmission and/or reflection properties, of a laser machining system, i.e. the laser machining head and/or the sensor module, can be recorded and evaluated. Based on the principle disclosed herein, it can be determined and shown in particular whether process radiation, which is required for monitoring a laser machining process, for example a laser welding process, is present in the wavelength ranges under consideration and how high the ratios of the process radiation are in the respective wavelength ranges. It can also be determined whether comparability with systems of the same construction is guaranteed. The wavelength ranges under consideration may in particular include the following wavelength ranges relevant to error detection: a visible wavelength range for the detection of plasma radiation, an (N)IR wavelength range for the detection of thermal radiation and a wavelength range including the wavelength of the machining laser beam for the detection of laser radiation reflected back by a workpiece.

The invention claimed is:

1. A method for comparing a plurality of laser machining systems of a same type, wherein each of the plurality of laser machining systems comprises a laser machining head and a sensor module having at least one photodiode for detecting process radiation, said method comprising:

detecting radiation emitted from a light source by said photodiode and generating a corresponding intensity signal, wherein the radiation is guided from said light source to said photodiode by at least one optical element in said laser machining head and/or by at least one optical element of said sensor module;

aligning said laser machining head and said light source with one another so that the intensity signal assumes a maximum value;

comparing the maximum value of the intensity signal with at least one predetermined reference value; and determining a scaling factor based on the comparison of the maximum value of the intensity signal and the at least one predetermined reference value, wherein said light source is a stabilized and/or adjustable and/or controllable light source, whereby the plurality of laser machining systems of the same type are inspected independently of laser machining processes and the laser machining processes carried out by the plurality of laser machining systems of the same type are monitored using the scaling factor.

2. The method according to claim 1, wherein a beam path of the detected radiation, at least in sections, overlaps and/or is coaxial with a beam path of a machining laser beam in said laser machining head.

3. The method according to claim 1, wherein said light source is or comprises at least one of: an electric light source, a halogen lamp, a light-emitting diode, a broadband light source, and a light source with an emission spectrum between 350 nm and 2000 nm.

4. The method according to claim 1, wherein the step of detecting radiation comprises detecting a radiation intensity of the radiation by the at least one photodiode in a predetermined wavelength range and/or at a predetermined wavelength.

5. The method according to claim 4, wherein the predetermined wavelength range is or comprises one of the following wavelength ranges: a visible wavelength range, a near-infrared (NIR) wavelength range, an infrared wavelength range, a wavelength range of thermal radiation, a wavelength range of plasma radiation, wavelengths between 350 nm and 780 nm, wavelengths between 780 nm and 3 μm, wavelengths greater than 1 μm, and/or wherein the predetermined wavelength is a wavelength of a machining laser beam of the laser machining system and/or is 1064 nm.

6. The method according to claim 1, wherein the step of detecting radiation comprises:

detecting radiation by a first photodiode in a visible wavelength range and generating a first intensity signal based on the detected radiation; and/or detecting radiation by a second photodiode at a wavelength of a machining laser beam of said laser machining system and generating a second intensity signal based on the detected radiation; and/or detecting radiation by a third photodiode in an infrared wavelength range and generating a third intensity signal based on the detected radiation.

7. The method according to claim 1, wherein said optical element is or comprises one of the following: a transmissive element, a reflective element, a protective glass, a beam splitter, a mirror, a lens, a lens group, a lens pack, a focusing lens, a focusing optics, a collimating optics, a collimating lens, and a deflecting optics.

8. The method according to claim 1, wherein:

the method is for comparison of beam guidance of a plurality of laser machining heads of the plurality of laser machining systems of identical construction, and all steps are carried out with at least two laser machining heads of identical construction and with the same sensor module and the same light source; and/or the method is for comparison of detection of a plurality of sensor modules of the same construction, and all steps are carried out with the same laser machining head and the same light source and with at least two sensor modules of the same construction; and/or the method is for comparison of properties of a laser machining system at different points in time, and all steps are repeated with the same laser machining head, with the same sensor module and the same light source with a predetermined time interval.

9. The method according to claim 1, wherein the light source is fixedly installed, and/or wherein aligning said laser machining head and said light source with each other is carried out by moving said laser machining head.

10. The method according to claim 1, wherein the step of comparing the intensity signal with the at least one predetermined reference value comprises:

comparing a mean value and/or a maximum value of the intensity signal with a predetermined reference value.

11. The method according to claim 10, wherein, based on a mean value of the intensity signal for a specified laser machining head and a specified photodiode and based on the predetermined reference value, the scaling factor for this specified laser machining head and this specified photodiode is determined.

12. A method for operating a laser machining system, wherein the laser machining system comprises a laser machining head and a sensor module having at least one photodiode for detecting process radiation, said method comprising:

detecting radiation emitted from a light source by said photodiode and generating a corresponding intensity signal, wherein the radiation is guided from said light source to said photodiode by at least one optical element in said laser machining head and/or by at least one optical element of said sensor module, wherein the radiation emitted from the light source is not reflected from a workpiece before being detected by said photodiode;

aligning said laser machining head and said light source with one another so that the intensity signal assumes a maximum value;

comparing the maximum value of the intensity signal with at least one predetermined reference value; and determining a scaling factor based on the comparison of the maximum value of the intensity signal and the at least one predetermined reference value, wherein said light source is a stabilized and/or adjustable and/or controllable light source, whereby the laser machining system is inspected independently of laser machining process and the laser machining process carried out by the laser machining system is monitored using the scaling factor.

13. A method for comparing at least two laser machining systems, wherein each of the laser machining systems comprises a laser machining head and a sensor module having at least one photodiode for detecting process radiation, said method comprising the following steps performed by a first laser machining system:

detecting radiation emitted from a light source by said photodiode and generating a corresponding intensity signal, wherein the radiation is guided from said light source to said photodiode by at least one optical element in said laser machining head and/or by at least one optical element of said sensor module;

aligning said laser machining head and said light source with one another so that the intensity signal assumes a maximum value; and comparing the maximum value of the intensity signal with at least one predetermined reference value, wherein said method further comprises the following steps performed by a second laser machining system:

detecting radiation emitted from the light source by said photodiode and generating a corresponding intensity signal, wherein the radiation is guided from said light source to said photodiode by at least one optical element in said laser machining head and/or by at least one optical element of said sensor module;

aligning said laser machining head and said light source with one another so that the intensity signal assumes a maximum value; and comparing the maximum value of the intensity signal with the predetermined reference value, the method further comprises determining a scaling factor based on the comparison of the maximum value of the intensity signal and the at least one predetermined reference value for each of the laser machining systems, wherein each light source is a stabilized and/or adjustable and/or controllable light source, whereby the first and second laser machining systems are inspected independently of laser machining processes and the laser machining processes carried out by the first and second laser machining systems are monitored using the scaling factor of the first and second laser machining systems.

\* \* \* \* \*